United States Patent
Sao (10) Patent No.: US 11,023,830 B2
(45) Date of Patent: Jun. 1, 2021

(54) PROCESSING A REQUEST IN ACCORDANCE WITH ORIGINAL RULES AND CONFIGURATIONS

(71) Applicant: Oracle International Corporation, Redwood Shores, CA (US)

(72) Inventor: Saurav Sao, Bangalore (IN)

(73) Assignee: Oracle International Corporation, Redwood Shores, CA (US)

( * ) Notice: Subject to any disclaimer, the term of this patent is extended or adjusted under 35 U.S.C. 154(b) by 1240 days.

(21) Appl. No.: 14/485,535

(22) Filed: Sep. 12, 2014

(65) Prior Publication Data

US 2015/0379029 A1    Dec. 31, 2015

Related U.S. Application Data (60) Provisional application No. 62/019,293, filed on Jun. 30, 2014.

(51) Int. Cl.
| | | |
|---|---|---|
| *G06F 16/176* | (2019.01) | |
| *G06F 16/188* | (2019.01) | |
| *G06F 16/957* | (2019.01) | |
| *G06Q 10/06* | (2012.01) | |
| *G06Q 10/10* | (2012.01) | |

(52) U.S. Cl.
CPC ............ *G06Q 10/06* (2013.01); *G06Q 10/10* (2013.01); *G06F 16/176* (2019.01); *G06F 16/188* (2019.01); *G06F 16/9574* (2019.01)

(58) Field of Classification Search
CPC ...... G06Q 10/06; G06Q 10/10; G06F 16/176; G06F 16/188; G06F 16/9574
USPC .................................................. 707/638–639
See application file for complete search history.

(56) References Cited

U.S. PATENT DOCUMENTS

| | | | | |
|---|---|---|---|---|
| 5,719,692 | A * | 2/1998 | Cohen | G06N 5/025 706/47 |
| 8,788,773 | B2 * | 7/2014 | Goodman | G06F 3/0647 711/162 |
| 2002/0087672 | A1 * | 7/2002 | Milligan | G06F 16/2329 709/223 |
| 2003/0126118 | A1 * | 7/2003 | Burton | G06F 17/301 |
| 2007/0226273 | A1 * | 9/2007 | Rath | G06F 17/3002 |
| 2008/0046505 | A1 * | 2/2008 | Netsch | H04L 51/04 709/203 |
| 2009/0222513 | A1 * | 9/2009 | Sallberg | G05B 19/0426 709/203 |

(Continued)

OTHER PUBLICATIONS

Oracle Fusion Middleware; 11g release; 92 pages; Apr. 2010.

(Continued)

*Primary Examiner* — Matthew Ell
*Assistant Examiner* — Berhanu Mitiku
(74) *Attorney, Agent, or Firm* — Trellis IP Law Group, PC (57) ABSTRACT

System and methods process a received request consistently over extended time by determining the request type and creating metadata with current rules and configuration information for the request type. A system stores the metadata, for instance in a versioning system, and may create a metadata snapshot associated with the request. Through the metadata, the system uses the correct version of rules and configurations to consistently process the request in accordance with the time the request was originally received.

17 Claims, 3 Drawing Sheets

(56) References Cited

U.S. PATENT DOCUMENTS

| | | | |
|---|---|---|---|
| 2012/0054149 A1* | 3/2012 | Khanna | G06F 16/24565 707/609 |
| 2012/0291090 A1* | 11/2012 | Srinivasan | G06F 21/604 726/1 |
| 2013/0262800 A1* | 10/2013 | Goodman | G06F 3/0647 711/162 |
| 2014/0281247 A1* | 9/2014 | Loaiza | G06F 16/24552 711/126 |
| 2015/0074641 A1* | 3/2015 | Nambiar | G06F 8/71 717/121 |
| 2015/0212897 A1* | 7/2015 | Kottomtharayil | G06F 11/1448 714/20 |

OTHER PUBLICATIONS

Magento Orders Tutorial; 7 pages; downloaded via circa Apr. 2, 2014.

Configuration Management Job Plans; 1 page; downloaded via circa Apr. 2, 2014.

* cited by examiner

PROCESSING A REQUEST IN ACCORDANCE WITH ORIGINAL RULES AND CONFIGURATIONS

CROSS REFERENCES TO RELATED APPLICATIONS

This application claims priority from U.S. Provisional Patent Application Ser. No. 62/019,293, entitled "Pinning The Configuration With A Message/Request", filed on Jun. 30, 2014, which is hereby incorporated by reference as if set forth in full in this application for all purposes.

BACKGROUND

The field of the invention relates to enterprise software systems (ESS) and methods and systems for processing requests.

Orders, requests, and other messages between users and applications or between applications (referred to generally herein as requests) issued to enterprise software systems may be subject to complicated and time-consuming procedures, including those which may require approvals and/or actions from multiple inside departments and/or outside partners. Dependent on the request type, a few, or many, rules may determine how the request is processed, which inside and outside parties are involved, what type of approval, activity, or feedback data is needed from which parties, and under what conditions the request is handled one way or another way.

For instance, a purchase order coming in through Internet from an external customer may trigger a credit card payment process handled by an external party (a credit card company), receiving a confirmation or the actual payment from the credit card company, a verification whether the ordered product is on stock in a warehouse, creation of an invoice and shipment slip, a shipment from the warehouse to a point of fulfilment and/or to the outside customer, an update of the stock records, a replacement order with the product vendor if stock drops below a minimum number, and so on.

Similarly, a human resources (HR) department may run performance measurement procedures on an employee, and may need to collect feedback various managers and departments the employee regularly interfaces with. A performance feedback request may seek to collect different types of feedback dependent on the requested department, manager, the employee's job type, etc. Therefore, the request submitted by the HR department may trigger one or more additional requests for submission to the various involved parties. Rules implemented by enterprise software systems might determine what parties should be involved for a particular employee type, employee location, what templates should be used for which parties, whether a reminder should be sent if feedback hasn't been received within a preset time, etc.

Rules for fulfilling an outside customer purchase order may be very different than rules for requesting employee performance feedback. These examples are intended as illustrations and enterprise software systems may handle many different request types. Regardless of the request type, the basic method of processing is roughly as follows. An ESS receives a request, determines the request type, then based on the request and the request type the ESS determines the rules for processing the request.

The different types of actions codified by the rules may require the use of different modules, or applications, within the enterprise software system. Each of these modules may have its own configuration, which may be dependent on the version of the module.

The ESS may process some types of requests immediately and provide results within a few seconds. However, other request types may have considerable processing time. For example, an ESS may require user interaction to fulfill a request, such as receiving user approval of a purchase order, which may take a few days, weeks, or even months to receive. During such extended request processing times, system administrators may need to change the rules for processing requests. For example, a system administrator may reconfigure, update or replace a module, and adjust rules accordingly; he or she may add new modules, which may require new rules or modification of existing rules; or, he or she may add, modify, or delete rules to account for changes in the enterprise, its organization, external partners, or any other changes that affect how a type of request must be processed.

While in some cases a request may always need to be processed with the latest available rules and configurations, in other cases a change of rules or configuration during the pendency of a request leads to undesirable results.

There is an unmet need to avoid problems created by processing requests over an extended time period during which processing rules may change. Embodiments of the invention address this unmet need.

SUMMARY

Embodiments of the invention include methods, systems, and computer-readable media with instructions for consistently processing requests over extended processing time periods. Embodiments of invention may receive a request; determine a request type; create metadata for the request type; and store the created metadata. These embodiments may forward the request for first processing in accordance with a first rule indicated by the stored metadata and receive a result from the first processing. Embodiments of the invention may then retrieve the metadata to process the result from the first processing according to a second rule indicated by the retrieved metadata and deliver the results of the second processing.

Further embodiments of the invention may create a snapshot including version information of the metadata and associate the request and the snapshot. Such embodiments of the invention use the metadata version information from the snapshot to process the request according to the correct rules. In some embodiments, the snapshot may include a reference to a correct version of the metadata.

Embodiments of the invention may store the metadata in a versioning system.

In embodiments of the invention, rules may include references to software applications; and, for instance, version and/or configuration information for the software applications.

A request may include a request, an order, a message, or a query.

In some embodiments the request type may be flat or non-hierarchical, whereas in other embodiments it may be hierarchical and it may trigger a related request or a sub-request.

A related request may have related metadata that is different than the original metadata. Embodiments receiving a related request use the related metadata to create a related snapshot, and to process the related request.

BRIEF DESCRIPTION OF THE DRAWINGS

The invention will be described with reference to the drawings, in which.

DESCRIPTION

Sometimes, processing orders, requests, and messages (generally referred to herein as requests) in an enterprise software system (ESS) can take a long time. Processing requires accessing request-type-specific rules, as well as system configuration information. A change of rules or of the configuration during the pendency of the request may lead to undesirable results as an ESS may partially process it with incompatible or inconsistent rules and configuration information. For instance, an order produced by manufacturer (OldPartner) must be followed up by a shipping request to (OldPartner), and not to (NewPartner), which has since become the manufacturer for new orders. The ESS must use a shipment rule that is consistent with the production rule at the time it received the order.

Embodiments of the invention avoid these problems by remembering and applying rules that are valid at the time the request is received. Some embodiments may take a snapshot of the versions of applicable rules and configurations at the time the original request is received, and tag the snapshot to the request.

Some embodiments of the invention capture rules and configuration information applicable to a request or request type in metadata. When a change occurs in metadata, the old version must be maintained and kept accessible. Embodiments of the invention may perform version management using a versioning system, or version control system. Embodiments of the invention may use any type of versioning system or technique known in the art, including, for example Oracle's database-based Metadata Services (MDS) Repository, or the Concurrent Versions System (CVS) software. A snapshot, if used in an embodiment of the invention, may include a list of independent and dependent rules and configurations, along with their version information.

Figure 1:
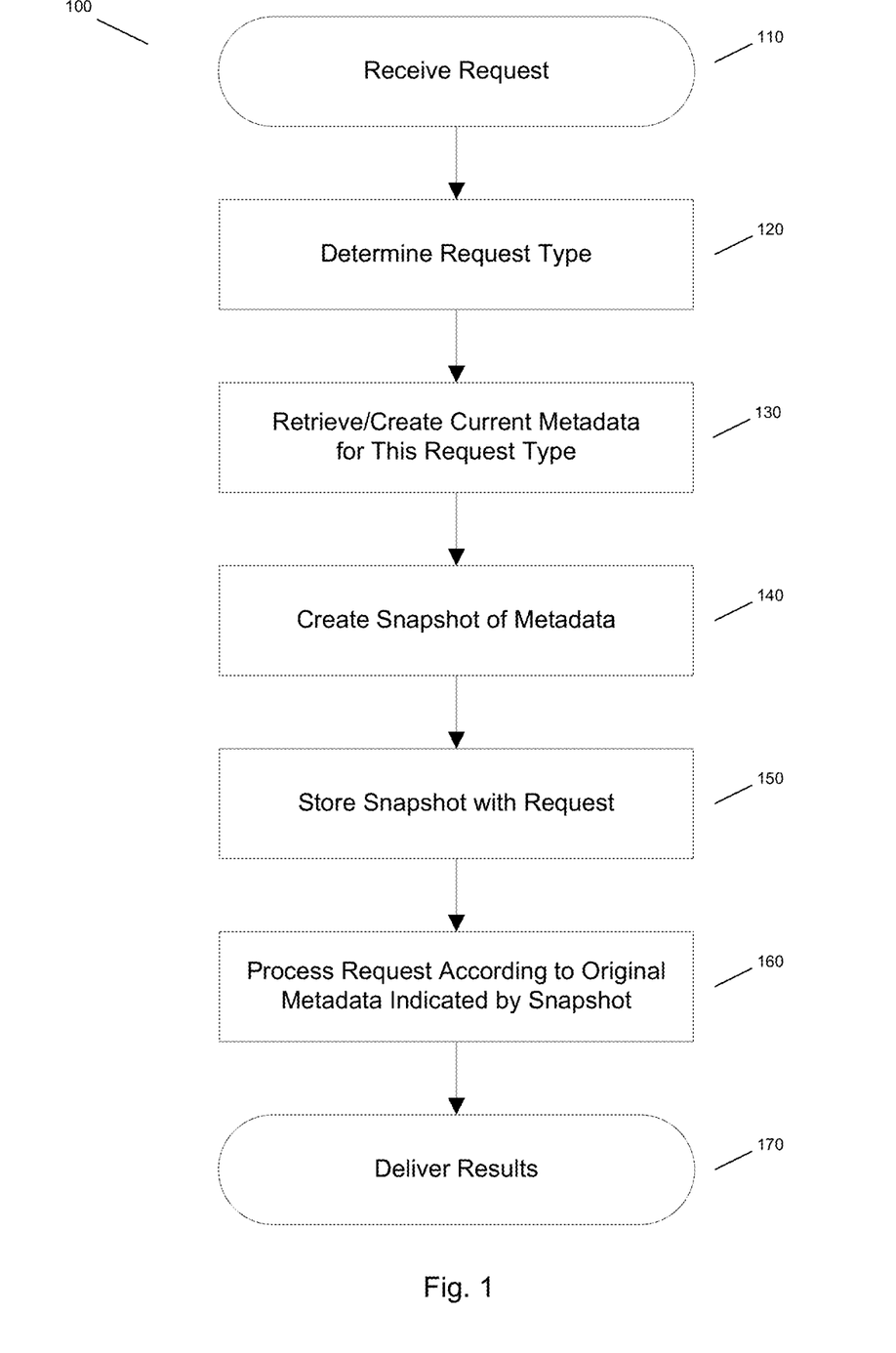
FIG. 1 illustrates a method for tagging a request with a snapshot containing metadata version information according to an embodiment of the invention.

FIG. 1 illustrates a method 100 for tagging a request with a snapshot containing metadata version information according to an embodiment of the invention. This method comprises the following steps.

Step 110—Receiving a request. The example method 100 begins with receiving a request, which may include a request itself, an order, a message, a query, or in general any type of command given to an ESS, to a customer relation management (CRM) system, or to any other type of client-server application or system known in the art.

Step 120—Determining the request type. The example method 100 comprises determining the type of request received. Many types exist, including, but not limited to, purchase request, internal purchase order, external purchase order, stocking request, stocking order, shipment order, order cancelation, human resources query, performance measurement request, credit check, payment request, payment order, credit card charge order, credit order, and so on. Some request types may be flat, whereas other types may be hierarchical and include sub-requests, or related requests.

Step 130—Retrieving and/or creating current metadata for the request type. The example method 100 further comprises retrieving and/or creating current metadata associated with the request type. For request types that are seldom used, with respect to the frequency of changes in configuration and rules, one embodiment of the invention creates metadata upon receiving the request. For request types that are often used, another embodiment may pre-generate metadata at the time of the most recent change in configuration or rules and use the pre-generated metadata when it receives the request. Yet other embodiments may pre-generate much of the metadata, and complement it with metadata that may include information from the request itself—for instance a purchase request may include a preferred account to charge, and a backup account if charging the preferred account is not feasible.

Embodiments of the invention may store pre-generated and newly created metadata using a version control system or any other type of change tracking system known in the art.

Embodiments of the invention may use metadata including rules, such as sequences of actions, where some actions may be dependent on conditions. For example, these conditions may be evaluated based on information contained in the request, such as a shipment urgency that has been paid for. Or, in another example, a condition could be the outcome of a prior action or its date and/or time of completion; the date and/or time the request was received (for example: had the sale period expired?); the date and/or time that the request must be fulfilled (for example: is it low season, or weekend?); the temporary unavailability of a partner (for example: is freighter "A" fully booked this month?); or any other attribute or property included or associated with a request or associated with a request sender, receiver, partner, or intermediary. Rules may also include the use of templates, partners, or services.

Embodiments of the invention may use metadata further including references to software applications or ESS modules to be used to obtain certain results. Software typically uses certain presets and default settings, referred to as configuration information. Configuration may be global, or user-dependent, where often user-dependent settings override a global configuration. The metadata may include this configuration information, along with the reference to the relevant software application or ESS module.

Embodiments of the invention may use metadata including the information outlined in the previous paragraphs, or one or more references to locations where the actual information is stored. In case the actual information is stored in a versioning system, the metadata may point to or reference the current version of the information—which may sooner or later become outdated.

Step 140—Creating a snapshot of the metadata. The example method 100 may further include creating or retrieving a snapshot of the metadata. Regardless of whether the metadata includes the actual information or only a reference to it, the snapshot specifies a representation of the correct version of the metadata applicable to the received request. Embodiments of the invention may use the metadata itself, or a list of references or pointers to copies of the metadata included in a version control system, or even a reference or pointer to this list. This way the snapshot can be compact, yet fully reveal how the request is to be processed.

Step 150—Storing the snapshot with the request. For embodiments of the invention using a snapshot, the example method 100 includes associating the request and the snapshot, such that the ESS will know how to consistently handle its processing. Also, upon future inspection on how the request was processed, such embodiments of the invention are able to determine the identity and versions, if applicable, of modules involved in processing the request; the configurations of these modules; and the rules that were required and/or applied.

Step 160—Processing the request according to the original metadata indicated by the snapshot. The example method 100 includes the steps of retrieving the correct version of the metadata; executing the correct rules and the correct version of each rule; configuring and accessing the correct modules, and correct versions of modules; and using the correct versions of their configurations.

Step 170—Delivering results. The example method 100 may conclude by delivering results. By consistently using the rules, modules and configurations that were current at the time it received the request, the ESS fulfils the request and delivers results according to expectation. By versioning the metadata, this embodiment of the invention achieves predictability of results, and reliability of the ESS.

Figure 2:
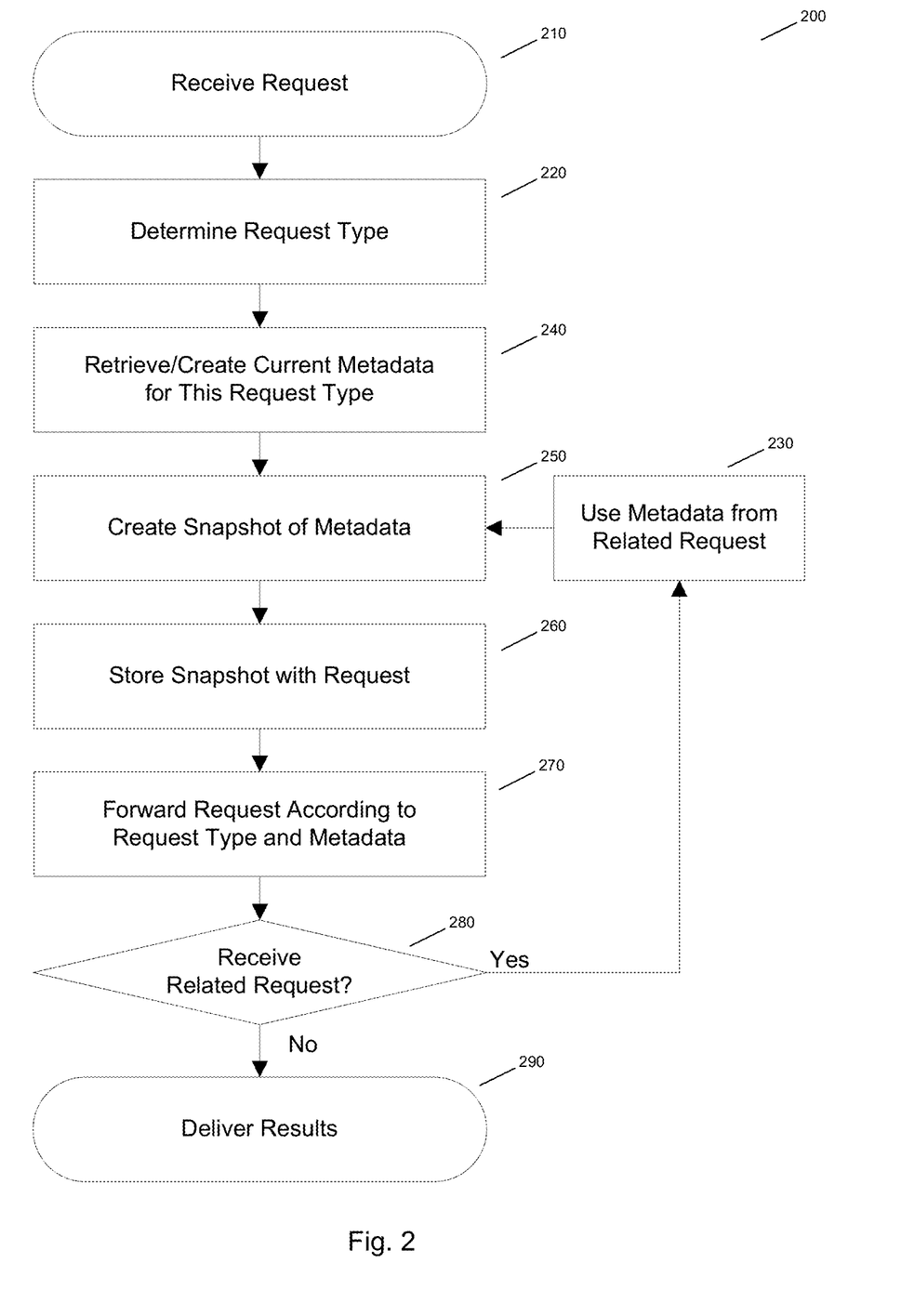
FIG. 2 illustrates an alternative embodiment of the invention in which metadata may be adapted during handling of a request related to the original request.

FIG. 2 illustrates an alternative embodiment 200 of the invention in which it may adapt metadata during handling of a request related to the original request. The initial steps of this method are the same as for the embodiment 100 in FIG. 1. These steps comprise receiving a request (210); determining the request type (220); retrieving and/or creating current metadata for this request type (240); creating a snapshot of the metadata (250); and storing the snapshot with the request (260). The example method 200 further comprises the following steps.

Step 270—Forwarding the request according to the request type and metadata. This example method 200 includes forwarding the request and snapshot, in accordance with request type and metadata. An ESS with this embodiment 200 of the invention may execute different types of requests in different modules. Embodiments may include rules that indicate which modules are used. Embodiments may also include rules that prompt a request to trigger one or more related requests and/or sub-requests.

Step 280—Receiving a related request. This example method 200 includes checking if any related requests or sub-requests are received (these two fashions of a request will further be referred to herein as related requests). Embodiments of the invention may automatically generate a related request by execution of a rule, or they may submit it as a result of human interaction. Embodiments of the invention include a related request that may have related metadata, which could be related to the original data. It may be the same, partially the same, partially different, or fully different. In either of these cases, embodiments of the invention may use the metadata of the related request for the processing of the related request, whereas they execute the remainder of processing the original request with the original metadata. Other embodiments may modify the original metadata as a result of the processing of the related request.

Step 230—Using the metadata from this related request. Upon receiving a related request, embodiments 200 of the invention use the prior steps from the method 200, starting with determining the related request type (220), and use the metadata from the related request.

Step 290—Delivering results. Once this example embodiment 200 of the invention receives no more related requests, it delivers results.

Figure 3:
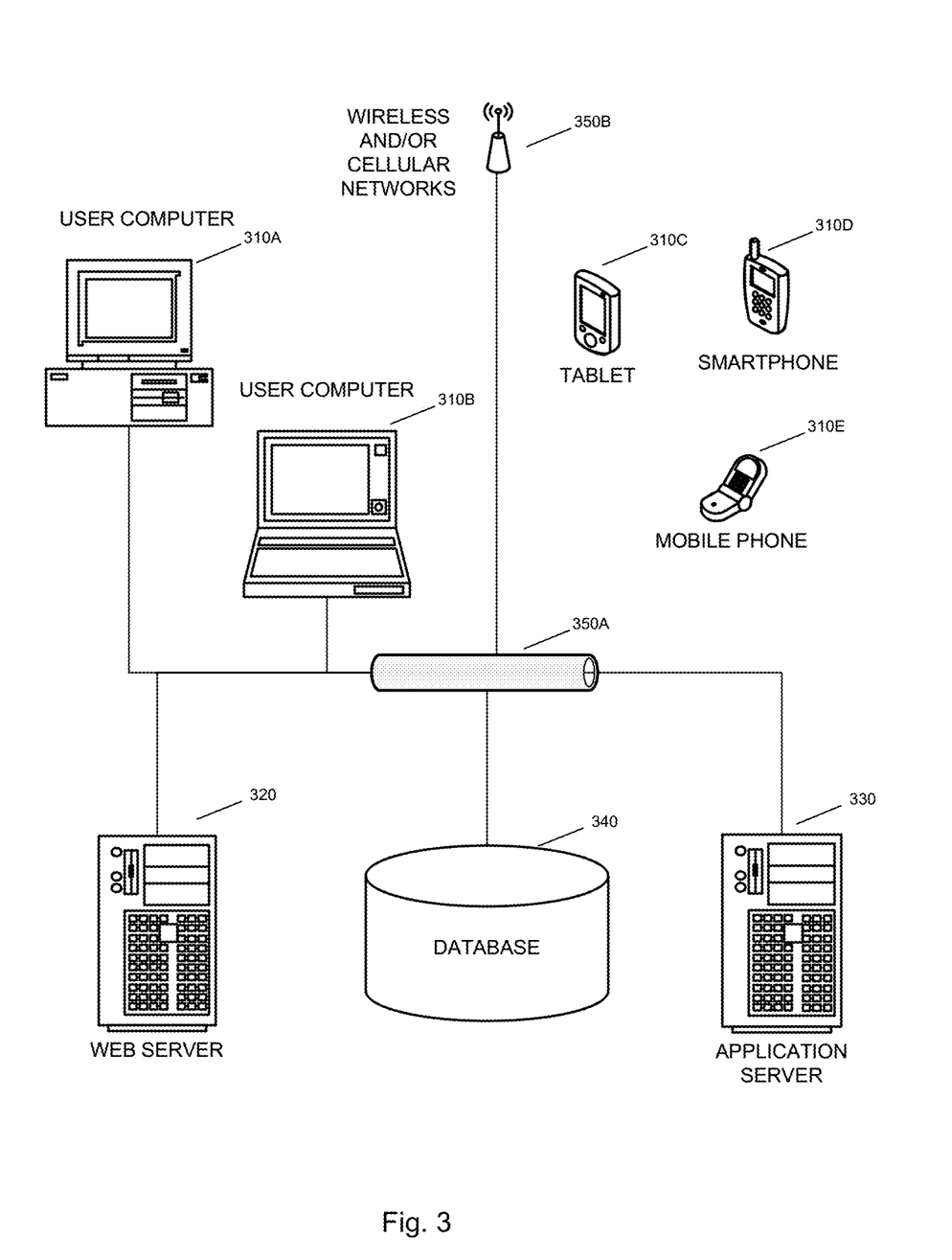
FIG. 3 illustrates an example system suitable for implementing embodiments of the invention.

FIG. 3 illustrates an example system 300 suitable for implementing embodiments of the invention. Embodiments of the invention may be implemented as standalone applications or as web-based applications implemented using a combination of client-side and server-side code. The system includes user devices 310 including desktop computers 310A and portable personal computers 310B, tablets 310C, smartphones 310D, and mobile phones 310E. The system can interface with any type of electronic device, such as a thin-client computer, Internet-enabled mobile telephone, mobile Internet access device, electronic book, or personal digital assistant, capable of displaying and navigating web pages or other types of electronic documents and/or executing applications. Although the system 300 is shown with five user devices, any number of user devices can be supported.

A web server 320 is used to process requests from web browsers and standalone applications for web pages, electronic documents, enterprise data or other content, and other data from the user computers. The server may also provide push data or syndicated content, such as RSS feeds, of data related to enterprise operations.

Application server 330 operates one or more applications. The applications can be implemented as one or more scripts or programs written in any programming language, such as Java, C, C++, C #, or any scripting language, such as JavaScript or ECMAScript, Perl, PHP, Python, Ruby, or TCL. Applications can be built using libraries or application frameworks, such as Rails, Enterprise JavaBeans, or .NET. Web content can be created using HTML, CSS, and other web technology, including template languages and parsers.

The data applications on application server 330 process input data and user device requests and can store or retrieve data from database 340. Database 340 stores data created and used by the data applications. In an embodiment, the database 340 is a relational database that is adapted to store, update, and retrieve data in response to SQL format commands or other database query languages. In other embodiments, unstructured data storage architectures and NoSQL databases may also be used.

In an embodiment, the application server 330 is one or more general-purpose computers capable of executing programs or scripts. In an embodiment, the web server 320 is implemented as an application running on one or more general-purpose computers. The web server and application server may be combined and executed on the same computers.

An electronic communication network 350 enables communication between user computers 310, web server 320, application server 330, and database 340. In an embodiment, network 350 may further include any form of electrical or optical communication devices, including wireless 350B and wired 350A networks. Network 350 may also incorporate one or more local-area networks, such as an Ethernet network; wide-area networks, such as the Internet and cellular carrier data networks; and virtual networks, such as a virtual private network.

The system is one example for executing applications according to an embodiment of the invention. In another embodiment, application server, web server, and optionally database can be combined into a single server computer application and system. In a further embodiment, virtualization and virtual machine applications may be used to implement one or more of the application server, web server, and database. In still further embodiments, all or a portion of the web server and application functions may be integrated into an application running on each of the user computers.

For example, a JavaScript application on the user computer may be used to retrieve or analyze data and display portions of the applications.

Although the description has been described with respect to particular embodiments thereof, these particular embodiments are merely illustrative, and not restrictive. For instance, the system for processing the request does not need to be an ESS. It may be a much smaller system, or one that is dedicated for managing a single aspect of an organization's activities, or just a few aspects. Alternatively, it may be a system that acts as a personal assistant, and instead of on a large corporate network it may only be installed on a smartphone.

Any suitable programming language can be used to implement the routines of particular embodiments including C, C++, Java, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time.

Particular embodiments may be implemented in a computer-readable storage medium for use by or in connection with the instruction execution system, apparatus, system, or device. Particular embodiments can be implemented in the form of control logic in software or hardware or a combination of both. The control logic, when executed by one or more processors, may be operable to perform that which is described in particular embodiments. For example, a tangible medium such as a hardware storage device can be used to store the control logic, which can include executable instructions.

Particular embodiments may be implemented by using a programmed general purpose digital computer, by using application specific integrated circuits, programmable logic devices, field programmable gate arrays, optical, chemical, biological, quantum or nano-engineered systems, components and mechanisms may be used. In general, the functions of particular embodiments can be achieved by any means as is known in the art. Distributed, networked systems, components, and/or circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

A "processor" includes any suitable hardware and/or software system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real time," "offline," in a "batch mode," etc. Portions of processing can be performed at different times and at different locations, by different (or the same) processing systems. A computer may be any processor in communication with a memory. The memory may be any suitable processor-readable storage medium, such as random-access memory (RAM), read-only memory (ROM), magnetic or optical disk, or other tangible media suitable for storing instructions for execution by the processor.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

Thus, while particular embodiments have been described herein, latitudes of modification, various changes, and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit.

I claim:

1. A method for consistently processing a request received at a first time on a computer system including multiple applications, wherein an application has a first version requiring a first configuration and can handle a first request type, the method comprising:
   receiving a request;
   determining if the request is of the first request type, wherein the first request type is subject to procedures that require interactions with outside partners including a verification, a confirmation, and a payment, and wherein an interaction takes at least two days;
   determining metadata for the request based on the first request type, wherein the metadata includes information about the first configuration and captures at least a first rule and a second rule which are consecutively applicable to the request;
   tagging a snapshot to the request, wherein the snapshot includes the first rule and the second rule at a time of receiving the request;
   storing the metadata along with the request;
   forwarding the request for first processing according to the first rule;
   while retaining rule version information in the stored metadata, related to the first request type replacing the second rule by a third rule that was not valid at the first time;
   keeping the second rule accessible and maintaining the second rule;
   receiving a result from the first processing of the request;
   retrieving the stored metadata for the request; and
   processing the result on the computer system using the second rule according to the rule version information in the stored metadata.

2. The method of claim 1, comprising storing the metadata in a versioning system.

3. The method of claim 1, wherein the metadata includes a reference indicating the second rule.

4. The method of claim 1, wherein the metadata includes a version of the second rule.

5. The method of claim 1, wherein the metadata includes a timestamp.

6. The method of claim 1, wherein the metadata includes a reference to a software application adapted to process the request.

7. The method of claim 1, wherein the metadata includes pre-generated information.

9

8. The method of claim 1, wherein the request includes an order.

9. The method of claim 1, wherein the request includes a message.

10. The method of claim 1, wherein the request includes a query.

11. The method of claim 1, wherein the request is hierarchical.

12. The method of claim 11, wherein the processing of the request by at least one of the first and second rules triggers a related request with related metadata.

13. The method of claim 12, wherein the related metadata is at least in part different than the stored metadata.

14. The method of claim 12, further comprising:
receiving the related request;
storing the related metadata;
creating a related snapshot of the related metadata, wherein the related snapshot includes related metadata version information;
associating the related request and the related snapshot; and
using the related metadata version information from the related snapshot to process the related request in accordance with the related metadata version.

15. The method of claim 1, wherein the processing of the request by at least one of the first and second rules is performed by an enterprise software system.

16. A system for consistently processing a request received at a first time, comprising:
an application server coupled with a data storage device and adapted to receive requests from a user device via at least one network, the application server including multiple applications, wherein an application has a first version requiring a first configuration and can handle a first request type, wherein the first request type is subject to procedures that require interactions with outside partners including a verification, a confirmation, and a payment, and wherein an interaction takes at least two days;
wherein the application server is programmed to perform a method comprising:
receiving a request from the user device;
determining if the request is of the first request type;
determining metadata for the request based on the first request type, wherein the metadata includes information about the first configuration and captures at least a first rule and a second rule which are consecutively applicable to the request;
tagging a snapshot to the request, wherein the snapshot includes the first rule and the second rule at a time of receiving the request;

10 storing the metadata along with the request in a database;
forwarding the request for first processing according to the first rule;
while retaining rule version information in the stored metadata, related to the first request type replacing the second rule by a third rule that was not valid at the first time;
keeping the second rule accessible and maintaining the second rule;
receiving a result from the first processing of the request;
retrieving the stored metadata from the database; and
processing the result on the application server using the second rule according to the rule version information in the stored metadata.

17. A tangible, non-transitory, computer-readable information storage medium including instructions adapted to direct a processor to perform an operation, the operation comprising:
at a first time, receiving a request on a computer system including multiple applications, wherein an application has a first version requiring a first configuration and can handle a first request type, wherein the first request type is subject to procedures that require interactions with outside partners including a verification, a confirmation, and a payment, and wherein an interaction takes at least two days;
determining if the request is of the first request type;
based on the first request type, determining metadata for the request, wherein the metadata includes information about the first configuration and captures at least a first rule and a second rule which are consecutively applicable to the request;
tagging a snapshot to the request, wherein the snapshot includes the first rule and the second rule at a time of receiving the request;
storing the metadata along with the request;
forwarding the request for first processing according to the first rule;
while retaining rule version information in the stored metadata, related to the first request type replacing the second rule by a third rule that was not valid at the first time;
keeping the second rule accessible and maintaining the second rule;
receiving a result from the first processing of the request;
retrieving the stored metadata for the request; and
processing the result on the computer system using the second rule according to the rule version information in the stored metadata; and
delivering results of the request processing.

* * * * *

UNITED STATES PATENT AND TRADEMARK OFFICE
CERTIFICATE OF CORRECTION

PATENT NO. : 11,023,830 B2
APPLICATION NO. : 14/485535
DATED : June 1, 2021
INVENTOR(S) : Sao Page 1 of 1

It is certified that error appears in the above-identified patent and that said Letters Patent is hereby corrected as shown below:

In the Specification

In Column 6, Line 26, delete "C #," and insert -- C#, --, therefor.

Signed and Sealed this
Twenty-first Day of September, 2021

Drew Hirshfeld
*Performing the Functions and Duties of the*
*Under Secretary of Commerce for Intellectual Property and*
*Director of the United States Patent and Trademark Office*